United States Patent
Yang et al.

(10) Patent No.: US 7,905,649 B2
(45) Date of Patent: Mar. 15, 2011

(54) DISPLAY DEVICE AND OPTICAL DEVICE

(75) Inventors: Ying Bao Yang, Kanagawa (JP); Masaru Higuchi, Tokyo (JP); Hiromasa Suzuki, Tokyo (JP); Susumu Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 12/267,091

(22) Filed: Nov. 7, 2008

(65) Prior Publication Data

US 2009/0135625 A1 May 28, 2009

(30) Foreign Application Priority Data

Nov. 27, 2007 (JP) ................................. 2007-305612

(51) Int. Cl.
*F21V 7/04* (2006.01)

(52) U.S. Cl. ......... 362/612; 362/621; 362/613; 362/615; 362/97.1

(58) Field of Classification Search .................. 362/612, 362/613, 621, 622, 615, 628, 97.1–97.4, 362/330, 231

See application file for complete search history.

(56) References Cited

U.S. PATENT DOCUMENTS 7,325,958 B2 * 2/2008 Yang et al. ..................... 362/621
7,553,060 B2 * 6/2009 Tanabe .......................... 362/612

FOREIGN PATENT DOCUMENTS

| JP | 4-337979 | 11/1992 |
| JP | 11-353920 | 12/1999 |
| JP | 2003-275644 | 9/2003 |
| JP | 2003-279865 | 10/2003 |
| JP | 2004-020881 | 1/2004 |
| JP | 2005-275644 | 10/2005 |
| JP | 2006-156193 | 6/2006 |

* cited by examiner

*Primary Examiner* — Bao Q Truong
(74) *Attorney, Agent, or Firm* — Robert J. Depke; Rockey, Depke & Lyons, LLC

(57) ABSTRACT

Disclosed herein is a display device including, a visual target, and a backlight adapted to illuminate the visual target from the rear, the backlight including, a plurality of first light sources, second light sources, and a light guide plate, wherein the light guide plate has a plurality of projecting portions on a side surface portion thereof upon which the light, produced by the plurality of first and second light sources is incident, the projecting portions being arranged, along the side surface portion and project toward the one side of the given direction, the plurality of first light sources are disposed to be opposed to the tip surfaces of the plurality of projecting portions, and the second light sources are disposed to be opposed to the bottom surfaces of recessed portions formed between the plurality of projecting portions.

6 Claims, 4 Drawing Sheets

DISPLAY DEVICE AND OPTICAL DEVICE

CROSS REFERENCES TO RELATED APPLICATIONS

The present invention contains subject matter related to Japanese Patent Application JP 2007-305612 filed in the Japan Patent Office on Nov. 27, 2007, the entire contents of which being incorporated herein by reference.

BACKGROUND OF THE INVENTION

1. Field of the Invention

The present invention relates to a display device having a backlight and an optical device applicable to the same and other devices.

2. Description of the Related Art

Display devices are known which have a backlight using two or more light sources in combination. For example, Japanese Patent Laid-Open No. 2005-275644 relates to a touch panel liquid crystal display device. In this display device, the backlight radiates visible and invisible light onto the display panel. The image is displayed with the visible light. The detection target (e.g., user's finger) in proximity to the display panel is detected by detecting, with sensors, the invisible light reflected by the detection target. This document discloses the backlight configuration using two types of light sources in combination, i.e., visible and invisible light sources.

SUMMARY OF THE INVENTION

One of the possible methods of radiating visible and invisible light onto the display panel by using visible and invisible light sources in combination is to arrange a plurality of LEDs (Light Emitting Diode) adapted to produce visible light and a plurality of LEDs adapted to produce invisible light along the side surface of a light guide plate opposed to the rear surface of the display panel in a so-called sidelight-type backlight. However, it is difficult to arrange, in a limited space, namely, on the side surface of the light guide plate, a sufficient number of visible light LEDs in consideration of the display brightness required for visibility and a sufficient number of invisible light LEDs in consideration of the sensor sensitivity.

A possible solution to the above problem would be to arrange the visible and invisible light LEDs out of alignment with each other in the direction in proximity to but spaced from the side surface of the light guide plate. In this case, however, it is difficult to distribute visible and invisible light uniformly over the light guide plate due to various circumstances. For example, the invisible (or visible) light LEDs spaced from the side surface of the light guide plate cannot cause the produced light to efficiently fall upon the light guide plate. As a result, it is necessary to increase the number of LEDs so as to distribute invisible (or visible) light sufficiently over the light guide plate, thus resulting in increased power consumption.

It should be noted that two different light sources often require different numbers of LEDs. In a touch panel display device designed to display an image with visible light and detect the user operations with invisible light, for example, the invisible light LEDs are considered smaller in number than the visible light LEDs.

It is an object of the present invention to provide a display device and optical device which can uniformly radiate light of different wavelengths while at the same time offering a higher degree of freedom in the arrangement of a plurality of light sources different in wavelength and number.

The display device according to an embodiment of the present invention includes a visual target and a backlight adapted to illuminate the visual target from the rear. The backlight includes a plurality of first light sources, second light sources smaller in number than the first light sources and a light guide plate. The plurality of first light sources are disposed on the rear of the visual target and on one side of a given direction along the rear surface of the visual target to produce light of a first wavelength. The second light sources are disposed on the rear of the visual target and on the one side of the given direction to produce light of a second wavelength different from the first wavelength. The light guide plate is disposed to be opposed to the rear surface of the visual target. The light guide plate radiates the light, produced by the first and second light sources, across the rear surface of the visual target while at the same time guiding the light toward another side of the given direction. The light guide plate has a plurality of projecting portions on a side surface portion thereof upon which the light, produced by the plurality of first and second light sources, is incident. The projecting portions are arranged, along the side surface portion and project toward the one side of the given direction. The plurality of first light sources are disposed to be opposed to the tip surfaces of the plurality of projecting portions. The second light sources are disposed to be opposed to the bottom surfaces of recessed portions formed between the plurality of projecting portions.

The display device preferably includes a plurality of sensors. The sensors are preferably disposed in a distributed manner at positions on a plane overlapping the visual target and light guide plate. The sensors preferably detect the light of the second wavelength which has passed through the visual target from the rear side and has been reflected by a detection target which is located on the front of the visual target.

The first wavelength is preferably a visible light wavelength, and the second wavelength is an invisible light wavelength.

Projections and recesses are preferably formed on the tip surfaces of the plurality of projecting portions and the bottom surfaces of the recessed portions to scatter light. The projections and recesses on the bottom surfaces of the recessed portions are preferably formed smaller than those on the tip surfaces of the plurality of projecting portions.

A light-scattering substance is preferably mixed in the light guide plate. The light-scattering substance is preferably relatively higher in concentration in the region surrounding the region with which the visual target coincides and to which the second light sources are opposed as seen in plan view.

The optical device according to an embodiment of the present invention includes a plurality of first light sources, second light sources smaller in number than the first light sources and a light guide member. The plurality of first light sources produce light of a first wavelength. The second light sources produce light of a second wavelength different from the first wavelength. The light guide member guides the light, produced by the first and second light sources, in a given direction. The light guide member has a plurality of projecting portions on a surface portion thereof upon which the light from the plurality of first light sources and from the second light sources is incident. The plurality of projecting portions are arranged along the surface portion. The plurality of first light sources are disposed to be opposed to the tip surfaces of the plurality of projecting portions. The second light sources are disposed to be opposed to the bottom surfaces of recessed portions formed between the plurality of projecting portions.

The present invention permits uniform radiation of light of different wavelengths while at the same time offering a higher degree of freedom in the arrangement of a plurality of light sources different in wavelength and number.

DETAILED DESCRIPTION OF THE PREFERRED EMBODIMENT

Figure 1A:
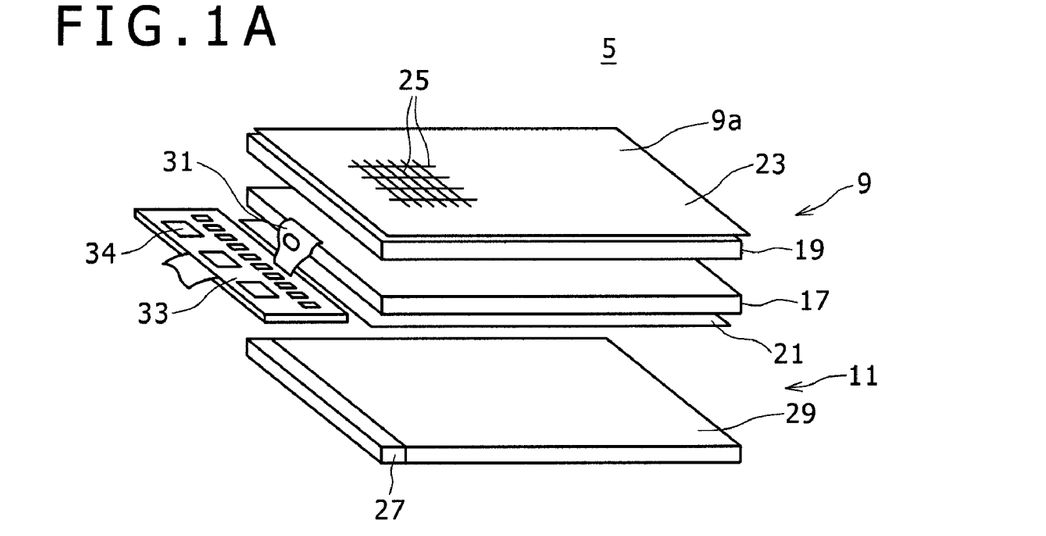
FIGS. 1A to 1C are schematic configuration diagrams of a display device according to an embodiment of the present invention.

FIG. 1A is an exploded perspective view illustrating the schematic configuration of a display device 5 according to a first embodiment of the present invention. It should be noted that some members and components are omitted in FIGS. 1A to 1C.

The display device 5 is a so-called touch sensor display device. As a result, the display device 5 can not only display an image on a display surface 9a which is shown on the top side of the page, but also detect a detection target such as user's finger in contact with or proximity to the display surface 9a. It should be noted that the top side of FIGS. 1A to 1C may be referred to as the front side or front, and the bottom side thereof as the rear side, back or rear in the description given hereinafter.

A description will be given first of the configuration of the display device 5 for displaying an image.

The display device 5 includes, for example, a transmissive or semi-transmissive liquid crystal display device and has a display panel 9 and backlight 11. The display panel 9 displays an image. The backlight 11 illuminates the display panel 9 from the rear thereof.

The display panel 9 includes, for example, an array substrate 17, CF substrate 19, liquid crystal 15 (refer to FIG. 1C) filled into the gap between the two substrates, incoming-side polarizing plate 21 and outgoing-side polarizing plate 23. The incoming-side polarizing plate 21 is stacked on the back of the array substrate 17. The outgoing-side polarizing plate 23 is stacked on the front of the CF (color filter) substrate 19. The display panel 9 has a plurality of pixels 25. The display panel 9 displays an image on the display surface 9a by controlling the light intensity from the backlight 11 passing through each of the plurality of pixels 25. It should be noted that the display surface 9a includes, for example, an unshown light transmitting layer which is stacked on the incoming-side polarizing plate 21 and outgoing-side polarizing plate 23.

The display panel 9 is electrically connected to a circuit substrate 33 via a TAB 31. The circuit substrate 33 has, for example, a control section (CPU (Central Processing Unit)) 34 which includes ICs (Integrated Circuit) and other components. The control section 34 transmits electric signals to the display surface 9a so as to display an image. The control section 34 also receives electric signals from the display panel 9 to detect the user operation performed on the display surface 9a.

The backlight 11 includes, for example, a sidelight-type backlight and has a light source section 27 and light guide plate 29. The light source section 27 produces visible and invisible light. The light guide plate 29 guides visible light from the light source section 27 toward the rear of the display panel 9 and radiates visible light across the rear surface of the display panel 9. The light source section 27 is disposed on the rear of the display panel 9 and on one side of a given direction along the rear surface of the display panel 9 (on the left side of FIG. 1A). The light guide plate 29 is formed in the approximate shape of a rectangular plate and disposed to be opposed to the rear surface of the display panel 9. The light guide plate 29 guides the light from the light source section 27, disposed on one side of The light guide plate 29, toward another side of the given direction along the rear surface of the display panel 9 (on the right side of FIG. 1A).

Figure 1B:
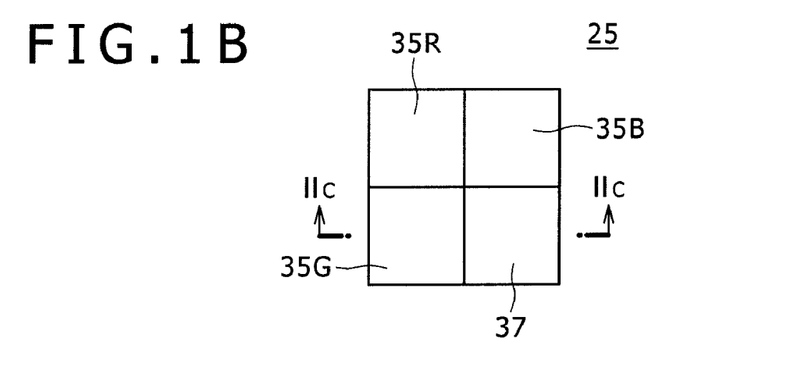

FIG. 1B is a plan view schematically illustrating the pixel 25.

The pixel 25 includes a plurality of subpixels 35R, 35G and 35B (hereinafter may be abbreviated as R, G and B) respectively associated with a plurality of (e.g., three) colors (light wavelengths). For example, the subpixels 35R, 35G and 35B are associated with red (R), green (G) and blue (B), respectively. The intensity of light of different colors from the three subpixels 35 is adjusted. As a result, an arbitrary color is visually identified as the color of the pixel 25, and an image is displayed on the display surface 9a.

Figure 1C:
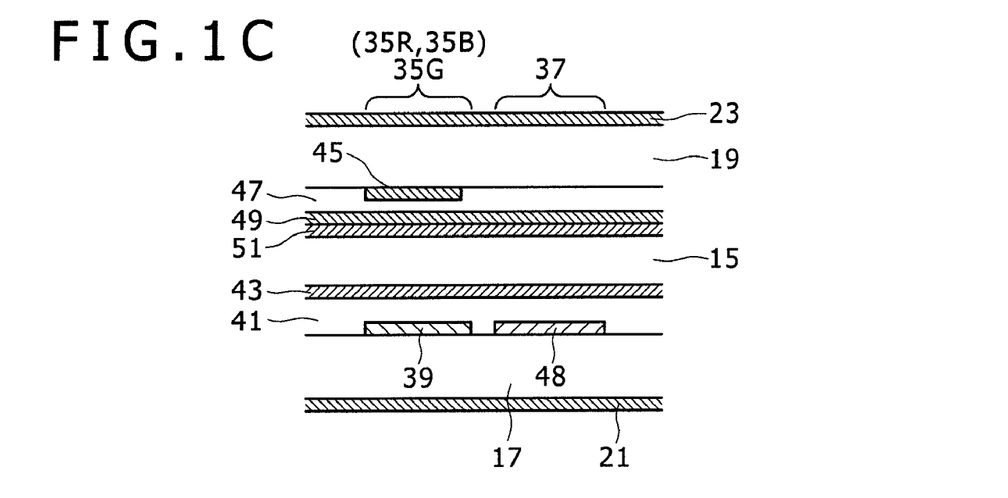

FIG. 1C is a diagram schematically illustrating the section along line IIc-IIc of FIG. 1B.

A pixel electrode 39, incoming-side planarizing layer 41 and incoming-side orientation film 43 are, for example, stacked one over the other on the surface of the array substrate 17 facing the liquid crystal 15 under the subpixel 35. The pixel electrode 39 is provided for each of the subpixels 35. The incoming-side planarizing layer 41 smoothes out the projections and recesses resulting, for example, from the pixel electrode 39. The incoming-side orientation film 43 orients the liquid crystal 15. Further, a color filter 45, outgoing-side planarizing layer 47, common electrode 49 and outgoing-side orientation film 51 are stacked one over the other on the surface of the CF substrate 19 facing the liquid crystal 15 under the subpixel 35. The color filter 45 transmits only light of the color associated with the subpixel 35. The outgoing-side planarizing layer 47 smoothes out the projections and recesses resulting, for example, from the color filter 45. The common electrode 49 is provided commonly for the plurality of subpixels 35. The outgoing-side orientation film 51 orients the liquid crystal 15.

It should be noted that the array substrate 17 has, in addition to the above, data electrodes (may be typically referred to as X electrodes, data signal lines or source signal lines), TFT (Thin Film Transistor) elements which function as switching elements adapted to drive the liquid crystal, and capacitors serving as signal holding capacitances for active matrix operation and other components. However, the illustration thereof is omitted.

When a voltage is applied between the pixel electrode 39 and common electrode 49 under the subpixel 35, the liquid crystal 15 is oriented in a direction different from that regulated by the incoming-side and outgoing-side orientation films 43 and 51. The liquid crystal 15 is oriented at an angle appropriate to the voltage applied. This controls the optical rotation angle of the polarized light which travels from the incoming-side polarizing plate 21 to the outgoing-side polarizing plate 23. This, in turn, adjusts the light intensity of the subpixel 35.

A description will be given next of the configuration of the display device 5 for detecting user operations.

As illustrated in FIG. 1B, the pixel 25 has a detection section 37 adapted to detect light falling upon the pixel 25 from the front of the display surface 9a. It should be noted that the arrangement of the subpixels 35 and detection section 37, as seen in plan view, may be set as appropriate. FIG. 1B illustrates the case in which the subpixels 35 and detection section 37 are arranged in a rectangular manner.

As illustrated in FIG. 1C, a photoelectric sensor 48 is provided, for example, under the detection section 37 in place of the pixel electrode 39 provided under the subpixel 35. The photoelectric sensor 48 converts received light into an electric signal. The photoelectric sensor 48 includes, for example, a PIN or PDN photodiode made of a-Si or u-Si. The photoelectric sensor 48 is formed, for example, by photolithography of the array substrate 17 as with TFT elements and other components.

It should be noted that the color filter 45 may or may not be provided under the detection section 37. Further, if the photoelectric sensor 48 detects user operations by using infrared light as mentioned later, an IR filter adapted to pass only infrared light may be provided, rather than the color filter 45, in order to provide a higher S/N ratio.

Figure 2A:
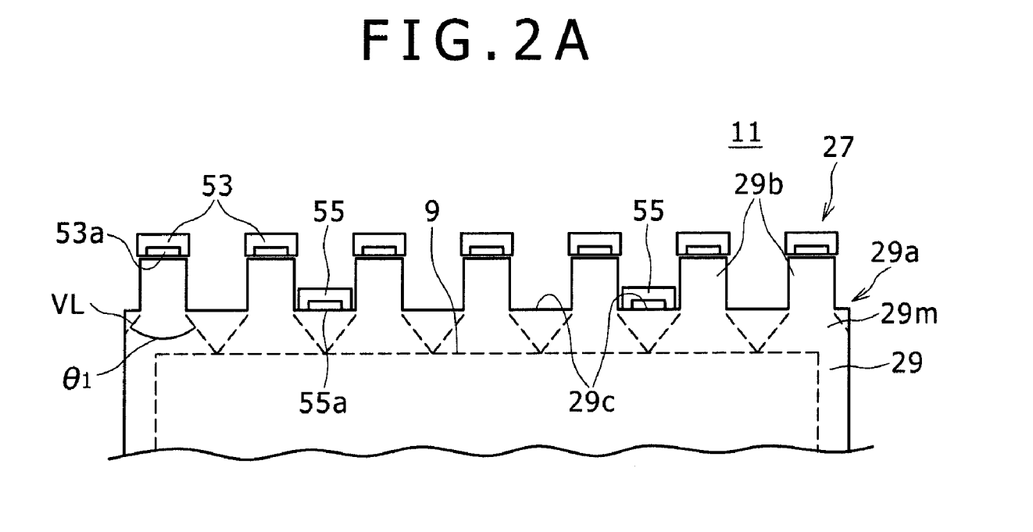
FIGS. 2A and 2B are plan views illustrating, in enlarged fashion, the area surrounding a light source section of the display device shown in FIG. 1.
Figure 2B:
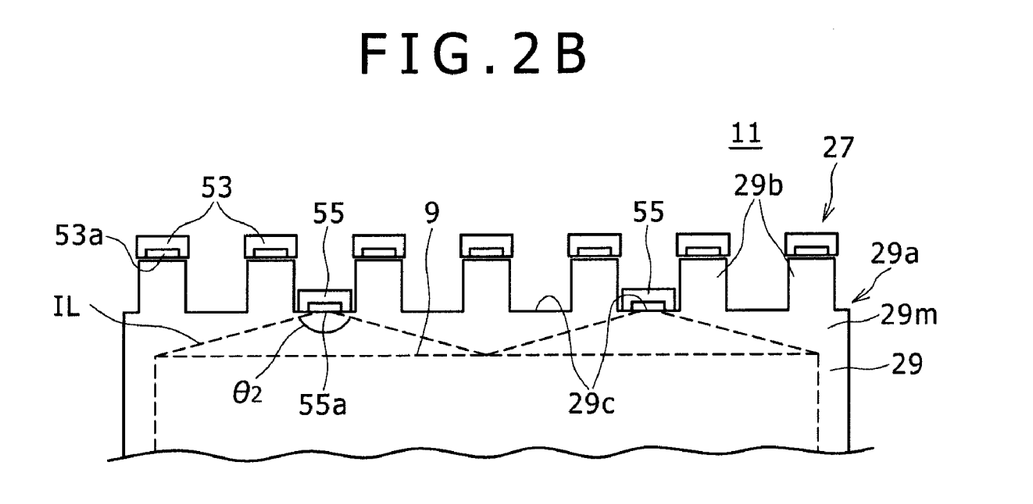

FIGS. 2A and 2B are plan views illustrating, in enlarged fashion, the area in the neighborhood of the light source section 27 of the backlight 11. It should be noted that FIG. 2A illustrates the manner in which visible light VL is radiated from the light source section 27, and FIG. 2B the manner in which invisible light IL is radiated therefrom.

The light source section 27 includes a plurality of visible light LEDs 53 adapted to produce the visible light VL and a plurality of invisible light LEDs 55 adapted to produce the invisible light.

The visible light VL is, for example, white light. The invisible light IV is, for example, infrared light. According to CIE (Commission International de l'Eclairrage), the boundary in wavelength between ultraviolet light (also an example of invisible light) and visible light is 360 nm to 400 nm, and that between visible light and infrared light is 760 nm to 830 nm. Practically, however, light having a wavelength of 350 nm or less may be considered ultraviolet light, and that having a wavelength of 700 nm or more infrared light.

The visible and invisible light LEDs 53 and 55 each include, for example, a reflector-equipped chip LED.

These LEDs are formed generally in a rectangular shape as a whole and have radiation surfaces 53a and 55a on one surface of the rectangle (bottom side of the page in FIGS. 2A and 2B). Each of the radiation surfaces 53a and 55a is slightly smaller than the surface of the visible LED 53 or invisible LED 55 where the radiation surfaces 53a or 55a is provided. The visible and invisible light LEDs 53 and 55 are disposed so that the radiation surfaces 53a and 55a are respectively opposed to a side surface portion 29a of the light guide plate 29. The plurality of invisible light LEDs 55 are smaller in number than the visible light LEDs 53. FIGS. 2A and 2B illustrate the case in which the seven visible light LEDs 53 and two invisible light LEDs 55 are provided. The visible and invisible light LEDs 53 and 55 may be sized as appropriate. In FIGS. 2A and 2B, the visible and invisible light LEDs 53 and 55 are generally equally sized.

The light guide plate 29 includes, for example, a transparent acrylic plate and guides light from the light source section 27 along its front and rear surfaces while totally reflecting the light by these surfaces. An unshown dot pattern (a plurality of projecting portions) is, for example, provided on the rear surface of the light guide plate 29. The dot pattern is formed integrally with the light guide plate 29 or formed by a separate member therefrom. The guided light is scattered by the dot pattern and radiated onto the display panel 9. It should be noted that a reflecting sheet adapted to reflect light may be provided on the rear side of the light guide plate 29, and a diffusing sheet or prism sheet on the front side thereof.

The light guide plate 29 has a plurality of projecting portions 29b projecting toward the light source section 27. The plurality of projecting portions 29b are arranged on the side surface portion 29a upon which the light from the light source section 27 falls. The projecting portions 29b are arranged, as seen in plan view, along the side surface portion 29a. The plurality of projecting portions 29b are formed, for example, in the same shape and size and arranged at constant intervals. The plurality of projecting portions 29b are, for example, rectangular in shape. A plurality of recessed portions 29c are formed between the plurality of projecting portions 29b, by the projecting portions 29b.

The plurality of visible light LEDs 53 are disposed to be opposed to the tip surfaces of the plurality of projecting portions 29b. Further, the plurality of invisible light LEDs 55 are disposed to be opposed to the bottom surfaces of the plurality of recessed portions 29c. In other words, the plurality of visible light LEDs 53 are arranged, as seen in plan view, in the direction along the side surface portion 29a of the light guide plate 29. The plurality of invisible light LEDs 55 are disposed, as seen in plan view, not only more toward the bottom side of the page in FIGS. 2A and 2B (light guiding side of the light guide plate 29) than the plurality of visible light LEDs 53 but also between the plurality of visible light LEDs 53 in the direction along the side surface portion 29a. That is, the plurality of visible and invisible light LEDs 53 and 55 are selectively arranged in two columns in an alternating manner.

It should be noted that the recessed portion 29c is sized, for example, slightly larger than the size into which the invisible light LED 55 fits or the size of the invisible light LED 55. The tip surface of the projecting portion 29b is sized, for example, equal to or slightly larger than the radiation surface 53a of the visible light LED 53.

According to the above embodiment, the display device 5 includes the display panel 9 and backlight 11. The backlight 11 illuminates the display panel 9 from the rear thereof. The backlight 11 includes the plurality of visible light LEDs 53, the invisible light LEDs 55 smaller in number than the plurality of visible light LEDs 53, and the light guide plate 29. The plurality of visible light LEDs 53 are disposed on the rear of the display panel 9 and on one side (left side of the page in FIGS. 1A to 1C) of a given direction along the rear surface of the display panel 9 (horizontal direction of the page in FIGS. 1A to 1C) to produce light of a visible wavelength (in the visible spectrum). The invisible light LEDs 55 are disposed on the rear of the display panel 9 and on the one side (left side of the page in FIGS. 1A to 1C) of the given direction to produce light of an invisible wavelength (in the invisible spectrum). The light guide plate 29 is disposed to be opposed to the rear surface of the display panel 9. The light guide plate 29 radiates the light, produced by the first and second light sources, across the rear surface of the display panel 9 while at the same time guiding the light toward another side of the given direction (right side of the page in FIGS. 1A to 1C). The light guide plate 29 has the plurality of projecting portions 29b on the side surface portion 29a upon which the light, produced by the plurality of visible and invisible light LEDs 53 and 55, falls. The projecting portions 29b are arranged, as seen in plan view, along the side surface portion 29a and project toward one side of a given direction (top side of the page in FIGS. 2A and 2B). The plurality of visible light LEDs 53 are disposed to be opposed to the tip surfaces of the plurality of projecting portions 29b. The plurality of invisible light LEDs 55 are disposed to be opposed to the bottom surfaces of the recessed portion 29c formed between the plurality of projecting portions 29b. Thus, the present embodiment permits uniform radiation of light of different wavelengths while at the same time offering a higher degree of freedom in the arrangement of the visible and invisible light LEDs 53 and 55 which differ in wavelength and number from each other. More specifically, the present embodiment is configured as follows.

As illustrated in FIG. 2A, the visible light VL from the visible light LED 53 is guided by the projecting portion 29b to reach a main body portion 29m of the light guide plate 29. Upon reaching the main body portion 29m, the visible light VL is guided toward the bottom side of the page in FIGS. 2A and 2B while at the same time spreading out at a constant angle θ1 in the horizontal direction of the page in FIGS. 2A and 2B (in the direction of arrangement of the plurality of projecting portions 29b). Of the light falling upon the projecting portion 29b from the visible light LED 53, the light significantly inclined relative to the projecting portion 29b does not reach the main body portion 29m because it is emitted from the outer perimeter surface (interface) between the plurality of projecting portions 29b. As a result, the angle θ1 at which the visible light VL, which has reached the main body portion 29m, spreads out is relatively small. However, the plurality of visible light LEDs 53 are provided in large number. Therefore, the visible light VL spreads out uniformly over the area opposed to the display panel 9 in the horizontal direction of the page in FIGS. 2A and 2B.

As illustrated in FIG. 2B, the invisible light IL from the invisible light LED 55 falls directly upon the main body portion 29m of the light guide plate 29. The invisible light IL is guided toward the bottom side of the page in FIGS. 2A and 2B while at the same time spreading out at a constant angle θ2 in the horizontal direction of the page in FIGS. 2A and 2B (in the direction of arrangement of the plurality of projecting portions 29b). Unlike the visible light VL, all the light from the invisible light LED 55 basically falls upon the main body portion 29m, irrespective of its angle. Therefore, the angle θ2 at which the invisible light IL spreads out on the main body portion 29m is larger than the angle θ1 at which the visible light VL spreads out. As a result, the invisible light LEDs 55 are smaller in number than the visible light LEDs 53. However, the invisible light IL spreads out uniformly over the area opposed to the display panel 9 in the direction of arrangement of the plurality of projecting portions 29b.

Therefore, the arrangement of the plurality of visible and invisible light LEDs 53 and 55 at different distances from the side surface portion 29a has been previously difficult to achieve due to the difficulty involved in uniformly guiding light. However, this arrangement, in other words, the arrangement of the plurality of visible and invisible light LEDs 53 and 55 in two columns, is possible. As a result, the visible and invisible light LEDs 53 and 55 can be less spaced from each other or located to partially coincide with each other in the direction along the side surface portion 29a (in the horizontal direction of the page in FIGS. 2A and 2B). This makes it possible to provide a large number of LEDs on the side surface portion 29a. Further, the visible and invisible light LEDs, different in optimal power from each other, can be each arranged in an optimal number.

In the above embodiment, the backlight 11 is an example of the optical device (illumination device) of the present invention, the display panel 9 an example of the visual target thereof, the visible light LED 53 an example of the first light source thereof, the invisible light LED 55 an example of the second light source thereof, the visible light an example of light of the first wavelength thereof, the invisible light an example of light of the second wavelength thereof, the light guide plate 29 an example of the light guide member thereof, and the side surface portion 29a of the light guide plate 29 an example of the side surface and surface portions thereof.

Figure 3:
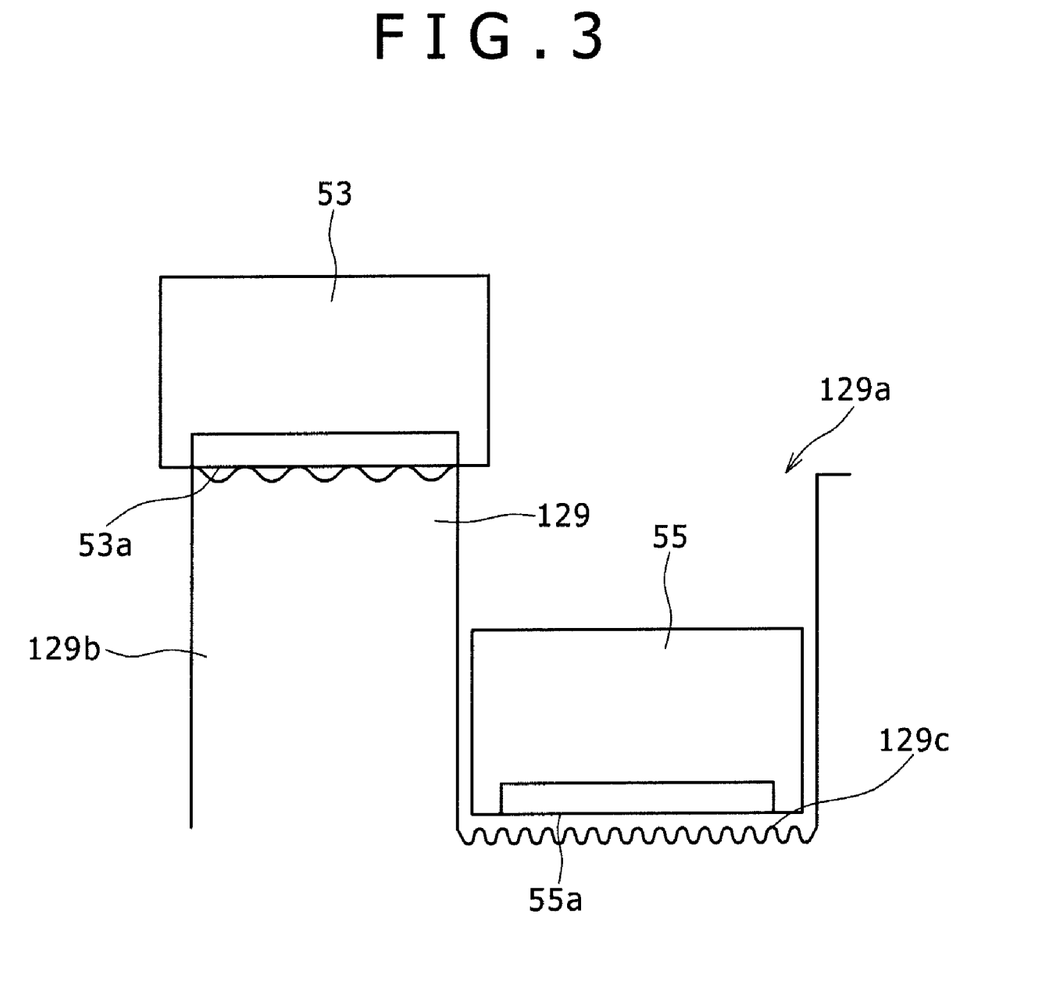
FIG. 3 is a plan view illustrating the essential portion of a modification example of the present invention.

FIG. 3 is a plan view illustrating the essential portion of a modification example of the present invention.

A light guide plate 129 in the modification example has projections and recesses formed on the tip surface of a projecting portion 129b and on the bottom surface of a recessed portion 129c to scatter light. The projections and recesses on the bottom surface of the recessed portion 129c are formed smaller than those on the tip surface of the projecting portion 129b.

Therefore, the invisible light IL falling upon the bottom surface of the recessed portion 129c is more likely to spread out in the horizontal direction of the page in FIG. 3 (direction along a side surface portion 129a as seen in plan view) in the light guide plate 129 than the visible light VL. As a result, although the invisible light LEDs 55 are smaller in number than the visible light LEDs 53, the invisible light IL can be guided as uniformly as the visible light VL.

It should be noted that projections and recesses may be disposed two-dimensionally as seen from above the page in FIG. 3. Alternatively, projecting rims (grooves), long in the direction passing through the page, may be disposed one-dimensionally in the horizontal direction of the page in FIG. 3. Projections and recesses may be sized and spaced as appropriate.

Figure 4:
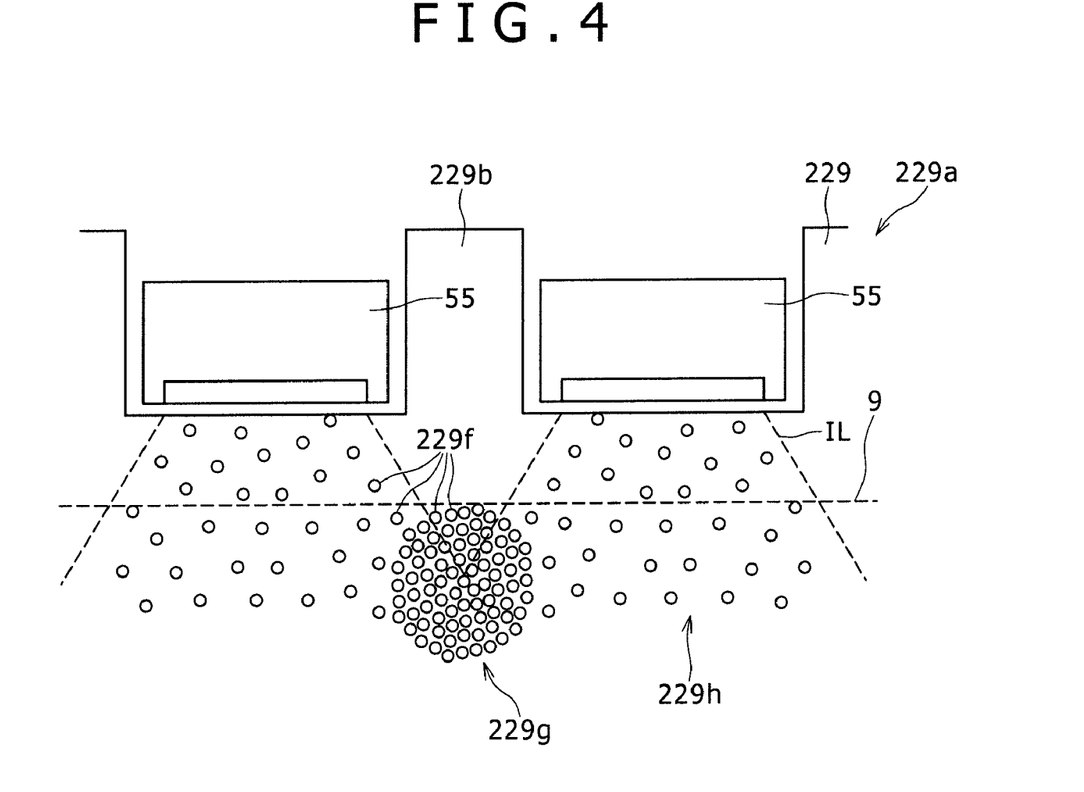
FIG. 4 is a plan view illustrating the essential portion of another modification example of the present invention.

FIG. 4 is a plan view illustrating the essential portion of another modification example of the present invention.

A light-scattering substance 229f adapted to scatter light is mixed in a light guide plate 229 of another modification example. For example, the light guide plate 229 includes a so-called highly scattering optical transmission polymer. That is, the light guide plate 229 is formed by mixing a polymer serving as the light-scattering substance 229f with an acrylic resin serving as the base material. The polymer has a refractive index different from that of the acrylic resin. The light-scattering substance 229f is relatively high in concentration in a surrounding area 229g around an opposed area 229h which coincides with the display panel 9 and to which the invisible light LED 55 is opposed. It should be noted that if the plurality of invisible light LEDs 55 are provided, the surrounding area 229g is located between the invisible light LEDs 55. FIG. 4 illustrates the case in which the invisible light LEDs 55 are disposed with a projecting portion 229b therebetween.

The invisible light LEDs 55 are small in number. Therefore, the intensity of the invisible light IL is likely low in the surrounding area 229b. As a result, the detection sensitivity of the detection target using the invisible light IL may be uneven in the plane direction of the display panel 9.

However, if the concentration of the light-scattering substance 229f in the surrounding area 229g is set relatively high as described above, the intensity of light emitted toward the display panel 9 accounts for a large percentage of the intensity of light guided into the light guide plate 29 in the surrounding area 229g. This evens out the intensity of light emitted toward the display panel 9 across the opposed area 229h and surrounding area 229g, thus suppressing the uneven detection.

The present invention is not limited to the above embodiment or modification examples, but may be carried out in various forms. Further, the forms shown in the embodiment and modification examples may be combined as appropriate.

The display device according to the present invention may be applied to all kinds of electronic equipment. For example, the display device according to the present invention may be applied to mobile phones, digital cameras, PDAs, laptop PCs, gaming machines, television sets, car navigators and ATMs.

The display device according to the present invention is not limited to that having a display panel adapted to display an image. In other words, the visual target viewed by the user is not limited to a display panel. For example, the visual target may be a plurality of keys or a piece of paper with maps or other graphics drawn thereon.

If the display device according to the present invention has a display panel, the display panel is not limited to that which displays an image by means of a plurality of pixels. For example, the display panel may be a segment display device. The display panel is not limited to a liquid crystal display device, but may be, for example, an organic EL display device or electronic paper (e-paper).

There may be the only one or plurality of second light sources so long as the second light sources are smaller in number than first light sources. The combination of the first and second wavelengths is not limited to the combination of visible and invisible light wavelengths. For example, the first and second wavelengths may be two different wavelengths in the visible spectrum. Alternatively, the first wavelength may be an invisible light wavelength, and the second wavelength a visible light wavelength. Further, the invisible light is not limited to infrared light, but may be ultraviolet light. The first and second light sources may produce light of a single wavelength as does a laser beam source. Alternatively, these light sources may produce light in a given range of wavelengths as does a white light source. If the first and second light sources each produce light in a range of wavelengths, the ranges of wavelengths of the first and second light sources may partially overlap each other.

The combination of applications of light of the first and second wavelengths is not limited to the combination of the illumination of the visual target and the detection of the detection target. For example, two different wavelengths in the visible spectrum may be used as the first and second wavelengths, in other words, the first and second light sources may be used which produce light of different colors, so that the illumination color can be changed by controlling the balance in light intensity between light from the first and second light sources.

The arrangement and density of the plurality of sensors may be set as appropriate. Further, the arrangement and density thereof may be locally changed. One sensor need not be provided for each pixel. For example, the sensors may be distributed in such a manner that a common sensor is provided for a plurality but a small number of pixels such as two to five pixels. The sensors may be provided on the front or back of the visual target (including the display panel).

The light guide member is not limited to that in the form of a plate (light guide plate), but may be in the form of a long rectangular parallelepiped or cube. Further, the light guide member is not limited to that which emits light in the direction intersecting the direction in which light is guided (top side of the page in FIGS. 1A to 1C in the embodiment) while at the same time guiding the light toward the light guiding direction (right side of the page in FIGS. 1A to 1C in the embodiment). The light guide member may emit light in the light guiding direction.

The plurality of projecting portions on the light guide member may be shaped as appropriate and are not limited to a rectangular shape. For example, the projecting portions may be formed so as to increase in diameter toward their tip. In this case, the first light sources opposed to the tip surfaces of the projecting portions can be increased in size.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
 a visual target; and
 a backlight adapted to illuminate the visual target from the rear, the backlight including:
  a plurality of first light sources disposed on the rear of the visual target and on one side of a given direction along the rear surface of the visual target to produce light of a first wavelength;
  second light sources disposed on the rear of the visual target and on the one side of the given direction to produce light of a second wavelength different from the first wavelength and smaller in number than the first light sources; and
  a light guide plate disposed to be opposed to the rear surface of the visual target so as to radiate the light, produced by the first and second light sources, across the rear surface of the visual target while at the same time guiding the light toward another side of the given direction, wherein
  the light guide plate has a plurality of projecting portions on a side surface portion thereof upon which the light, produced by the plurality of first and second light sources is incident, the projecting portions being arranged, along the side surface portion and project toward the one side of the given direction,
  the plurality of first light sources are disposed to be opposed to the tip surfaces of the plurality of projecting portions, and
  the second light sources are disposed to be opposed to the bottom surfaces of recessed portions formed between the plurality of projecting portions.

2. The display device of claim 1 further comprising
 a plurality of sensors disposed in a distributed manner at positions on a plane overlapping the visual target and light guide plate, the sensors being adapted to detect the light of the second wavelength which has passed through the visual target from the rear side and has been reflected by a detection target which is located on the front of the visual target.

3. The display device of claim 2, wherein
 the first wavelength is a visible light wavelength, and
 the second wavelength is an invisible light wavelength.

4. The display device of claim 1, wherein
 projections and recesses are formed on the tip surfaces of the plurality of projecting portions and the bottom surfaces of the recessed portions to scatter light, and
 the projections and recesses on the bottom surfaces of the recessed portions are formed smaller than those on the tip surfaces of the plurality of projecting portions.

5. The display device of claim 1, wherein
 a light-scattering substance is mixed in the light guide plate, and
 the light-scattering substance is relatively higher in concentration in the region surrounding the region with which the visual target coincides and to which the second light sources are opposed as seen in plan view.

6. An optical device comprising:
 a plurality of first light sources adapted to produce light of a first wavelength;

second light sources adapted to produce light of a second wavelength different from the first wavelength and smaller in number than the first light sources; and a light guide member adapted to guide the light, produced by the first and second light sources, in a given direction, wherein the light guide member has a plurality of projecting portions on a surface portion thereof upon which the light from the plurality of first light sources and from the second light sources is incident, the plurality of projecting portions being arranged along the surface portion, the plurality of first light sources are disposed to be opposed to the tip surfaces of the plurality of projecting portions, and the second light sources are disposed to be opposed to the bottom surfaces of recessed portions formed between the plurality of projecting portions.

* * * * *